UNITED STATES PATENT OFFICE.

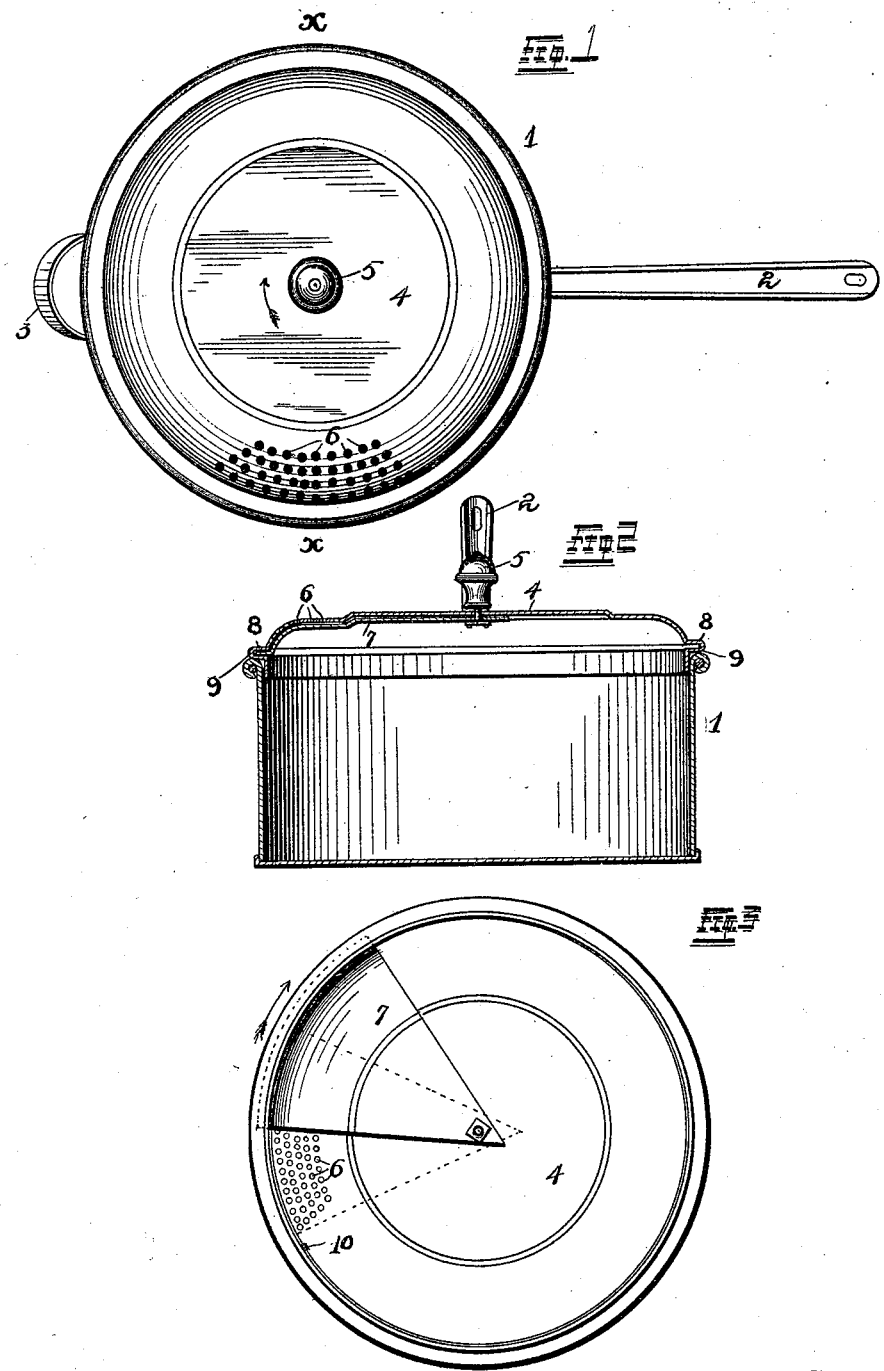

GRACE PFEIL, OF ST. LOUIS, MISSOURI.

STEW-PAN COVER.

SPECIFICATION forming part of Letters Patent No. 496,278, dated April 25, 1893.

Application filed November 8, 1892. Serial No. 451,365. (No model.)

*To all whom it may concern:*

Be it known that I, GRACE PFEIL, of the city of St. Louis and State of Missouri, have invented certain new and useful Improvements in Stew-Pan Covers, of which the following is a full, clear, and exact description, reference being had to the accompanying drawings, forming a part hereof.

My invention relates to improvements in "stew pan covers," and consists in the novel arrangement and combination of parts as will be more fully hereinafter described and designated in the claims.

In the drawings: Figure 1 is a top plan view of a stew pan showing the perforations in the lid thereof, said perforations forming a part of my complete invention. Fig. 2 is a vertical sectional view taken on a line $x\,x$ of Fig. 1. Fig. 3 is an inverted plan view of the stew pan cover.

The object of my invention is to construct a stew pan cover with adjustable parts in order that the water can be drained out of the stew pan without removing the lid thereof, and also to form an outlet for steam during the process of cooking.

Referring to the drawings: 1 indicates an ordinary stew pan provided with a grasping handle 2 upon one side and a small catch 3 by means of which the handling of the pan can be facilitated. The cover 4 is of the ordinary design generally used in this line of manufacture, and is provided with a lifting handle 5, which serves a double purpose, as hereinafter set forth.

A number of perforations 6 are made in the lid 4 at one side of its surface and serve as an outlet for steam and water except when a sliding adjustable cover 7 is adjusted so as to close the same. This sliding adjustable semi-cover 7 is in the shape of a cone, and conforms to the shape of the lid 4. The handle 5 which is preferably an ordinary wooden knob with a rivet running through same and said rivet holding in security the pointed end of the lid 7 and the connection between the two is such that by turning the knob 5, the semi-cover 7 is also moved. A track into which the broad end of the cone-shaped lid 7, the outer edge of which represents the segment of a circle, is held and which it travels is formed by the doubling under of the outer edges of the pan lid 4 and leaving a suitable distance between the two folds 8 and 9 formed by this construction, in which the cover 7 may be operated.

The position of the cover 7 when closing the aperture 6 in the lid 4 is shown by dotted lines in Fig. 3 and in order to uncover said perforations, the handle 5 is turned in a direction which moves the cover 7 from its position over the holes in the direction as shown by the arrow in Fig. 3.

The limit of the movement of the cover 7 is controlled by a drop of solder 10 being placed in the interior of the lid, in which the cover 7 travels.

I do not wish to control or limit the backward movement of said cover 7 as it will be found desirable to turn the cover back quite a distance in order that the inside of the cover 4 may be cleaned and dried in the cleaning of the vessel.

In operation the lid 4 should be placed upon the pan in the manner as shown in Fig. 1 with the perforations 6 at the opposite quarter to the handle 2.

Premising that the cover 7 is in the position as shown in dotted lines in Fig. 3, as closing the perforations 6, and it is desired to drain the water from the vessel leaving the solid contents dry, the handle 5 is turned in the direction as shown by an arrow in Fig. 1, thus turning the cover 7 from its position covering the perforations 6 and the user can then take the pan by the handle 2 and tilt the same upward and allow the water to run out through the perforations 6, while she holds the lid on with the other hand.

Having fully described my invention, what I claim is—

1. As an improved article of manufacture, a pan cover consisting of the cover 4 provided with apertures 6 and with an internal annular groove 8, an adjustable plate 7 located adjacent the interior surface of the cover, and having its outer edge engaging and sliding in said groove 8, and an operating knob 5 having a stem loosely projecting through the cover and rigidly secured to the inner end of the plate 7; substantially as and for the purpose set forth.

2. As an improved article of manufacture, a pan cover consisting of the cover 4 provided with apertures 6, a depending flange and with an internal annular groove 8 between said flange and the cover proper, an adjustable plate 7 located adjacent the interior surface of the cover, said plate being approximately triangular in shape and having its segmentally-curved outer end disposed and adapted to work in the groove 8, an operating knob 5 secured to the inner contracted end of the plate 7, and a stop 10 interrupting said groove 8; substantially as and as for the purpose set forth.

In testimony whereof I affix my signature in presence of two witnesses.

GRACE PFEIL.

Witnesses:
H. L. ROBINSON,
JULIAN C. HARVEY.